Patented May 25, 1954

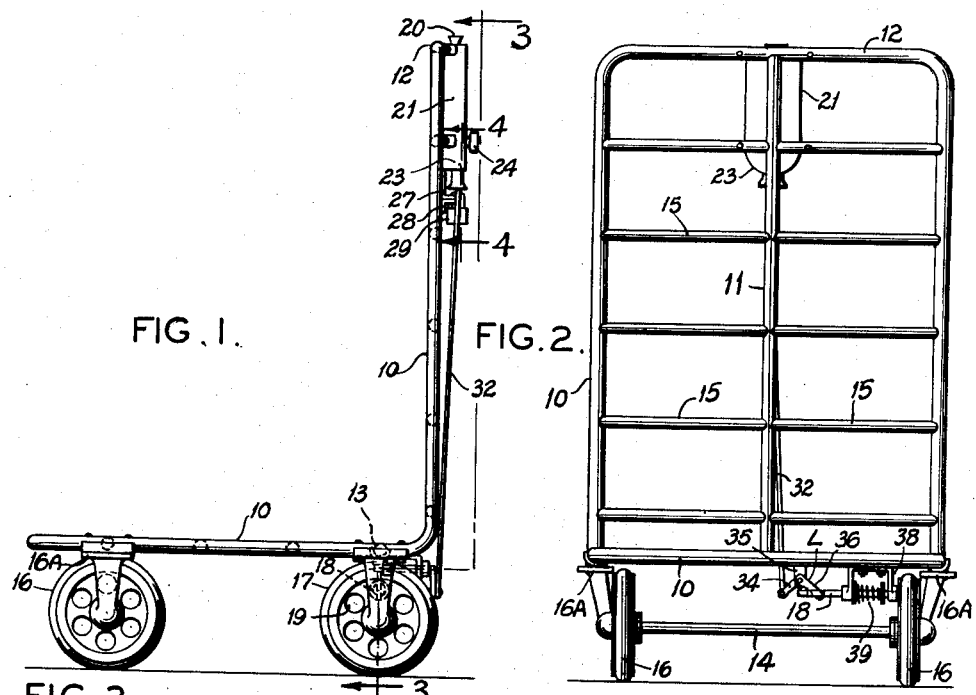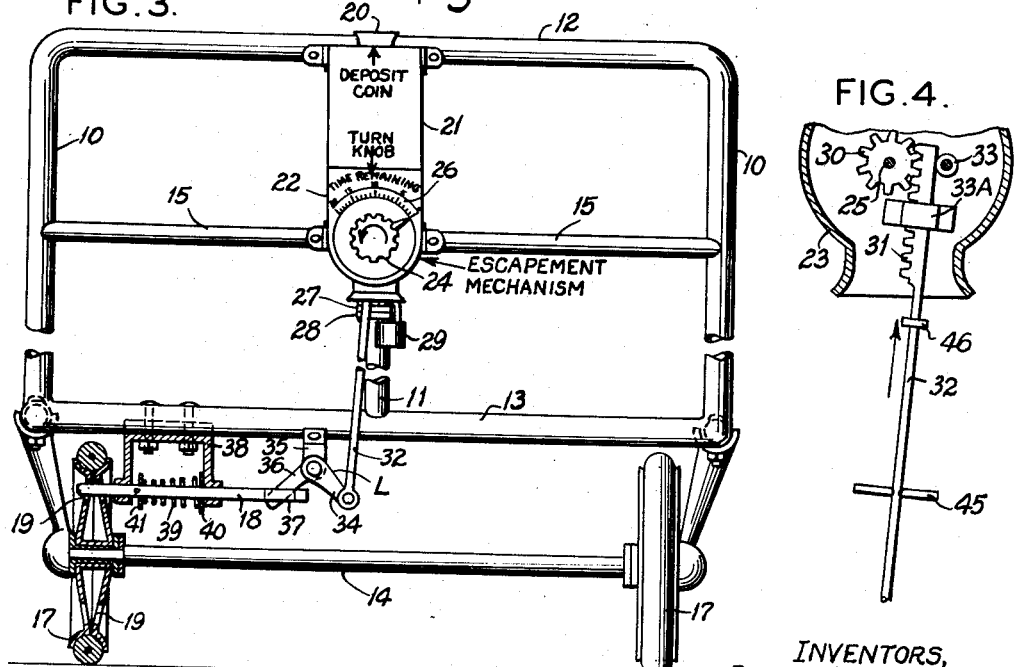

2,679,302

UNITED STATES PATENT OFFICE 2,679,302

POSITIVE LOCK FOR HAND PROPELLED VEHICLES FOR PUBLIC HIRE

Robert A. Watson, University City, and George E. Riemann, St. Louis, Mo.

Application January 29, 1951, Serial No. 208,386

3 Claims. (Cl. 188—31)

This invention pertains to hand propelled vehicles for public hire, and more particularly to time-controlled, coin activated vehicles and the controlling mechanism therefor. In a preferred embodiment, the vehicle carries a spring powered coin controlled meter controlling the permissive operation and period thereof, of the vehicle.

The subject device is simple in construction, thoroughly reliable and efficient in its operation, readily and easily operated, and inexpensive to manufacture, install, and maintain. It has a particular utility as a hand propelled vehicle such as a baggage push cart for use in transportation terminals. These vehicles will afford railroad, bus and airline passengers a safe, convenient, virtually effortless and economical means of moving baggage between various parts of the terminals.

The invention objectively consists of an automatic wheel arresting device mounted on a vehicle frame to provide and limit a period of permissive vehicle use. This wheel-stopping agency is controlled by a coin-activated timer with provisions for retracting the wheel arresting member from the wheel when a coin is inserted, and alternately, when the predetermined time period has elapsed the timer acts with related elements to arrest the wheel and to prevent use of the baggage cart until another coin is inserted.

Other objects and advantages will become apparent as the description progresses, and by reference to the drawing, wherein:

Fig. 1 is a side elevational view of the baggage vehicle showing the timer-controlled wheel-locking device assembled thereon;

Fig. 2 is a front elevational view of the vehicle shown in Fig. 1;

Fig. 3 is a rear elevational view, partly in section, of the vehicle and wheel locking mechanism as seen in staggered planes identified with line 3—3 of Fig. 1, and Fig. 4 is a fragmentary sectional view of a portion of a coin-controlled timer or clock mechanism as seen in a plane taken along line 4—4 of Fig. 1.

The novel coin-operated timer-controlled wheel locking device has particular utility when assembled on a manually propelled vehicle, such as a baggage cart, as shown in Fig. 1 of the drawing, but is susceptible of other fields of application. The frame of the vehicle may be constructed of either solid or tubular rod stock material. The outer portion 10 of the vertical and horizontal framework of the vehicle is preferably of one piece construction and designed so as to form a right angle when viewed from the side as in Fig. 1. A vertical bar member 11 is secured to the center of the horizontal handle bar 12 of the vertical frame, and extends downwardly thence horizontally in the same manner as the outer framework elements 10 of the vehicle, and is secured to a cross bar 13 of the horizontal frame overlying the rear axle 14. There are provided a plurality of cross bar members 15 secured to both the horizontal and vertical frames, giving rigidity to the vehicle and supporting the baggage conveyed thereon.

The front wheels 16 of the baggage cart are preferably mounted to have a castoring action, as through a swivel connection 16A, to facilitate guiding the vehicle, but the rear wheels 17 are kept in a strict forward alignment by the axle 14. In connection with the agencies disclosed for blocking the wheels, or one thereof, one of the rear wheels 17 is provided with one or more locking apertures 19 to accommodate the locking bar 18. A symmetrical wheel appearance is maintained by utilizing a series of circular openings 19 evenly spaced about the axis of rotation.

In the timing device disclosed, there is provided a coin receiver identified with a coin slot 20. A slug rejector 21, and a timer or clock mechanism 22 are contained in a housing 23 secured to the back of the vertical frame. A knob with indicator 24 on the face of the clock, is or may be attached to the main winding shaft 25 of the timer mechanism, the indicator designating the remaining period of permissive use as currently designated by the calibrated dial face 26.

A right angle member 27 is secured to the lower edge of the clock housing, the flange portion thereof mating with the flange portion of a second right angle member 28 secured to the middle bar 11 of the vertical frame. An ordinary pad lock 29, for example, is inserted through registering openings in the flanges thereby enabling the housing 23 to be removed from the cart, and disassembled if desired, so that coins may be removed or any needed service attention given the timer.

A gear 30 is secured to the internal portion of the main winding shaft 25 of the escapement mechanism, and operatively engages a rack portion 31 of a downwardly extending reciprocal rod 32. An idler roller 33 is secured to the interior of the housing on a horizontal line with the winding shaft 25, and serves to position the rack on rod 32 in meshing relation to the pinion 30 by rolling engagement with the rod margin opposite the rack portion 31. The rod 32 is further guided by a strap element 33A overlying the upper end of the rod, and which, even though the rack 31 be disengaged from the gear 30, will act, upon upward movement of the rod, to assure re-meshing of the rack and pinion. The extending rod 32 is pivotally connected to one arm 34 of an offset L lever or bell crank assembly including a rock shaft journalled in a holding bracket or bearing arm 35, secured to the cross bar member 13 overlying the rear axle 14 of the vehicle. This lever arrangement permits the locking bar 18 to operate horizontally in a plane containing the axis of the rear wheels. The other arm 36 of the bell-crank lever projects into a compatible slot 37 formed in the inner end portion of the locking bar 18.

A bearing arm or hanger in the form of a channel 38, is bolted to the same cross bar member 13, and is employed to guide and steady the locking bar 18, and to isolate from other parts of the mechanism any shearing force that might otherwise misalign or damage other elements in case it were attempted to push the vehicle when locked.

A coil spring 39 is located on the locking bar 18, and is positioned between the downwardly extending side elements of the channel structure 38, these latter being apertured to guide and journal the bar 18. The inner end of the spring abuts a circular disc member 40 normally engaging the inner right wall as illustrated in Fig. 3. The opposite end of the spring abuts another circular disc 41 secured to the locking bar 18, thereby imparting the spring loading to the bar 18 at times when it is to be extended into one of the circular wheel openings 19.

The operation of the vehicle, timer and control features is thought to have become fully apparent, but it may be noted for completeness that, with the vehicles placed in advantageous locations about the transportation terminals, the traveler may select a cart, and deposit a specified coin in the coin slot 20. If the coin is genuine and hence bypasses the slug rejector, the knob and indicator 24 operatively interconnecting the escapement mechanism of the time clock can then be turned in the indicated direction. As the knob is rotated, the gear 30 secured to the main winding shaft 25 operatively engages the rack portion 31 of the rod 32, and if the rack and pinion 30 be en mesh, raises the rod to an elevated position. In doing so, the rod actuates the bell crank and rockshaft lever in a counterclockwise direction (Fig. 3). The lever arm 36, engaging the locking bar 18, retracts the bar from the wheel aperture, permitting the vehicle to be used for the designated period of time. As the remaining time diminishes, the gear 30 lowers the extending rod 32 slowly until the time period of permissive use has expired. It is preferred that, at the conclusion of the period of hire, the rack portion 31 fully clear the pinion, releasing the spring 39 to force the bar 18 with a final snap action into arresting engagement with the wheel. In case the rack 31 clears the pinion as preferred, the rod 32 is, at the start of the ensuing period of usage, lifted slightly by a cross bar finger lift 45 so as again to mesh the rack and pinion. The piece 45 may be utilized as a sole control to wind the timer through gear 30 and to reset the bar 18. A fixed stop 66 will limit the upward movement of rod 32, and its downward movement limited by washer 41.

The coil spring 39 may if desired, be used not only to extend the bar into locking position, but may serve a dual capacity in being utilized also as the power spring for the clock mechanism, it being understood that the escapement is powered in well known manner from shaft 25. Since the escapement is or may be conventional, it is not illustrated other than by legend.

The described timer-controlled, coin activated baggage vehicle presents a convenient and economical service to travelers in lieu of the prevailing porter service, and will be particularly desirable to those persons having numerous items of baggage; prevailing porter regulations require a minimum charge for each baggage unit.

While there has been disclosed only a single preferred form of the invention, it should be understood that various changes or modifications may be made within the intended scope of the claims hereunto appended.

We claim as our invention:

1. In a hand-propelled baggage push cart for public hire for a limited period, a horizontal baggage-supporting deck, a vertical frame attached to and extending upwardly from one end of the deck, a pair of road wheels under one end of the deck and operating on fixed axes, at least one castored wheel forwardly of the first said wheels, a timer device of predetermined-interval type supported on an upper rear portion of said vertical frame, coin handling mechanism related to the timer for activation thereof incident to deposit of a coin, the timer including a shaft rotatable at a predetermined rate in response to normal timer action, a gear on said shaft, a rod extended from the timer, a rack connected to said rod and normally engaging said gear, a rock shaft carried by a lower portion of the vehicle frame, a bell crank lever on the rock shaft, one arm of said lever being connected to said extended rod, a horizontally movable plunger located to be reciprocally moved into and out of blocking relation to one of the first-said wheels of the vehicle at a point considerably spaced from the hub of said wheel, a second arm of the bell crank lever being operatively connected to said plunger, a spring coacting with the plunger and tending to bias same into wheel-blocking position, and a plunger guide and bearing structure in which the plunger is journalled at substantially spaced points, said guide and bearing structure being carried by the frame of the vehicle, and related to the plunger so as to constrain same to a rectilinear path of movement under all conditions, the spring being supported by the plunger and substantially in said guide and bearing structure, a guide for constraining said extended rod to a substantially linear path of movement, a manually actuated member for moving said extended rod in one direction, and means on the timer for indicating a currently remaining permissive period of usage of the vehicle, following activation of the timer, as by deposit of a coin.

2. In a hand-propelled baggage push cart for public hire for a limited period, including a horizontal baggage-supporting deck, a vertical frame attached to and extending upwardly from one end of the deck, a pair of road wheels under one end of the deck and operating on fixed axes, and at least one castored wheel forwardly of the first said wheels, the combination with a timer device of predetermined-interval type supported on an upper rear portion of said vertical frame, the timer including a shaft rotatable at a predetermined rate in response to normal timer action, a gear on said shaft and rotatable therewith, a rod extended from the timer, a rack carried by said rod and normally engaging said gear, a rock shaft carried by a lower portion of the vehicle frame, a bell crank lever on the rock shaft, one arm of said lever being connected to said extended rod, a horizontally movable plunger located to be reciprocally moved into and out of blocking relation to one of the first said wheels of the vehicle, a second arm of the bell crank lever being operatively connected to said plunger, a spring coacting with the plunger and tending to bias same into wheel-locking position, a plunger guide and bearing structure in which the plunger is journalled at substantially spaced points, said guide and bearing structure being carried by the frame of the vehicle, and related to the plunger so as to constrain same to a rectilinear path of movement under all conditions, the spring being supported by the plunger and substantially in said guide and bearing structure, a guide for constraining said extended rod to a substantially linear path of movement, the rack being operatively disengaged from said gear at the end of the predetermined interval as determined by said timer, said spring being adapted to cause an accelerated wheel-arresting action of said plunger upon disengagement of said rack from said gear, a manually actuated member connected to the extended rod for moving said extended rod in one direction, and for operatively re-engaging said rack to said gear, and means on the timer for indicating a currently remaining permissive period of usage of the push cart, following activation of the timer.

3. In a hand-propelled baggage push cart for public hire for a limited period, including a horizontal baggage-supporting deck, a vertical frame attached to and extending upwardly from one end of the deck, a pair of road wheels under one end of the deck and operating on fixed axes, and at least one castored wheel forwardly of the first said wheels, the combination with a timer device of predetermined-interval type supported on an upper rear portion of said vertical frame, the timer including a shaft rotatable at a predetermined rate in response to normal timer action, a gear on said shaft and rotatable therewith, a rod extended from the timer, a rack carried by said rod and normally engaging said gear, said gear normally driving the rack and hence the rod in response to the normal timer action, a rock shaft carried by a lower portion of the vehicle frame, a bell crank lever on the rock shaft, one arm of said lever being connected to said extended rod, a horizontally movable plunger located to be reciprocally moved into and out of blocking relation to one of the first said wheels of the vehicle at a point considerably spaced outwardly from the hub of said wheel, a second arm of the bell crank lever being operatively connected to said plunger, a spring coacting with the plunger and tending to bias same into wheel-locking position, a plunger guide and bearing structure in which the plunger is journalled at substantially spaced points, said guide and bearing structure being carried by the frame of the vehicle, and related to the plunger so as to constrain same to a rectilinear path of movement under all conditions, the spring being supported by the plunger and substantially in said guide and bearing structure, a guide for constraining said extended rod to a substantially linear path of movement, the rack being operatively disengaged from said gear at the end of the predetermined interval as determined by said timer, means for retaining the rack adjacent the gear after disengagement of said rack and gear, said spring being adapted to cause an accelerated wheel-arresting action of said plunger upon disengagement of said rack from said gear, the spring also being utilized as the power spring for the timer, a manually actuated member connected to the extended rod for moving said extended rod in one direction, and for operatively re-engaging said rack to said gear, and means on the timer for indicating a currently remaining permissive period of usage of the push cart, following activation of the timer.

References Cited in the file of this patent

UNITED STATES PATENTS

| Number | Name | Date |
|---|---|---|
| 422,245 | Miller et al. | Feb. 25, 1890 |
| 698,335 | Strauss | Apr. 22, 1902 |
| 1,141,100 | Braun | June 1, 1915 |
| 1,196,724 | Sherman et al. | Oct. 17, 1916 |
| 1,331,513 | Lindberg | Feb. 24, 1920 |
| 1,651,377 | Custer | Dec. 6, 1927 |
| 2,106,042 | Stark | Jan. 18, 1938 |
| 2,139,523 | Smith | Dec. 6, 1938 |
| 2,152,903 | Mastini | Apr. 4, 1939 |
| 2,198,058 | Mobeck | Apr. 23, 1940 |
| 2,552,675 | Hauflaire | May 15, 1951 |

FOREIGN PATENTS

| Number | Country | Date |
|---|---|---|
| 6,180 | Great Britain | Mar. 15, 1909 |